(12) United States Patent
Lewis

(10) Patent No.: US 7,977,263 B2
(45) Date of Patent: *Jul. 12, 2011

(54) GLASS FIBER FOR HIGH TEMPERATURE INSULATION

(75) Inventor: Albert Lewis, Chino, CA (US)

(73) Assignee: Glass Incorporated, Chino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/442,419

(22) Filed: May 26, 2006

(65) Prior Publication Data

US 2007/0275843 A1  Nov. 29, 2007

(51) Int. Cl.
*C03C 3/085* (2006.01)
*C03C 13/06* (2006.01)

(52) U.S. Cl. ............... 501/69; 501/35; 501/36; 501/70; 501/68

(58) Field of Classification Search .............. 501/27, 501/35, 36, 68–73
See application file for complete search history.

(56) References Cited

U.S. PATENT DOCUMENTS

| | | | | |
|---|---|---|---|---|
| 3,854,986 A | * | 12/1974 | Chvalovsky et al. | 428/391 |
| 3,858,964 A | * | 1/1975 | Piesslinger et al. | 385/141 |
| 4,764,487 A | | 8/1988 | Lewis | |
| 5,576,252 A | * | 11/1996 | Rapp et al. | 501/35 |
| 5,932,347 A | * | 8/1999 | Rapp et al. | 428/392 |
| 5,962,354 A | * | 10/1999 | Fyles et al. | 501/36 |
| 6,156,683 A | | 12/2000 | Grove-Rasmussen | |
| 6,794,322 B2 | * | 9/2004 | Sircar | 501/57 |
| 6,998,361 B2 | * | 2/2006 | Lewis | 501/36 |
| 7,189,671 B1 | * | 3/2007 | Lewis | 501/36 |
| 2002/0077243 A1 | * | 6/2002 | Sircar | 501/35 |
| 2003/0166446 A1 | | 9/2003 | Lewis | |
| 2004/0014586 A1 | * | 1/2004 | Otaki et al. | 501/35 |
| 2005/0079970 A1 | * | 4/2005 | Otaki et al. | 501/35 |
| 2005/0085369 A1 | * | 4/2005 | Jensen | 501/35 |

FOREIGN PATENT DOCUMENTS

| | | |
|---|---|---|
| JP | 58 064243 A | 4/1983 |
| JP | 60 180936 A | 9/1985 |
| WO | WO-03/076354 A1 | 9/2003 |
| WO | WO-2005/033029 A2 | 4/2005 |

OTHER PUBLICATIONS

International Search Report dated Aug. 28, 2007 from ISA/US re PCT/US2007/012456.
Supplementary European Search Report dated Nov. 24, 2010 from EPO re EP 06 82 6483.

* cited by examiner

*Primary Examiner* — Karl E Group
*Assistant Examiner* — Elizabeth A Bolden
(74) *Attorney, Agent, or Firm* — Berliner & Associates

(57) ABSTRACT

A glass composition is provided for the production of high temperature glass fibers with oxides comprising 1% to 15% $Fe_2O_3+FeO$ as a fluidizer to lower liquidous temperature and the fiberizing temperature of a mix of high temperature oxides. The glass composition has therein an appropriate content of high temperature oxides to produce glass fiber with high temperature limits and high burn-through properties.

13 Claims, No Drawings

GLASS FIBER FOR HIGH TEMPERATURE INSULATION

CROSS-REFERENCE TO RELATED APPLICATIONS

This application is a continuation in part of application 11/260,548 (filed Oct. 27, 2005), now U.S. Pat. No. 7,189,671 (issued Mar. 13, 2007).

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

Not applicable.

BRIEF SUMMARY OF THE INVENTION

The present invention relates to bio-soluble glass compositions, particularly to glass compositions having good fiberizing characteristics, high strength, high durability at high temperatures, high modulus of elasticity, good thermal conductivity, good acoustical property, good water repellency, and good chemical resistance.

There has long existed a demand for fiber glass compositions for successful formation into fibers, particularly for use for insulation and acoustical purposes, which can meet current FAA burn-through requirements.

The problems in achieving these desired characteristics at reasonable costs, have long been known in the glass art, but no satisfactory composition has been available for the forming of long and small diameter glass fibers of 0.5 to 2.0 microns, which are desired characteristics.

Problems associated with the achieving of such characteristics and the provision of appropriate products at reasonable costs, have long been known in the glass making art.

Although high temperature glass compositions have been provided in the prior art, they have been subject to the shortcomings of having a short working temperature range or of being too expensive to produce because of the high costs of raw material, low productivity, and high energy requirements.

The present invention resolves the problems by utilizing iron oxide ($Fe_2O_3$ and $FeO$) in the glass. The amount of iron in the glass was varied based on the amounts of other ingredients contained in the higher temperature glasses. A range of 1% to 15% of iron was utilized in experiments relative to the high temperature glass studies.

Fibers for aircraft insulation are of particular importance, particularly for commercial aircraft. The Federal Aviation Administration has long dictated that aircraft be made safer, and has issued a new regulation No. FAR 25.856(b) requiring burn-through protection for all OEM aircraft beginning in 2008.

Aircraft have been destroyed and people's lives lost by fire and crashes. Examples include an MD-11 aircraft which was burned and was destroyed in Canada, and an MD-80 aircraft which was destroyed by fire and crashed in Texas, as well as many other examples. These particular crashes were blamed on insulation blankets which caught fire and burned because the blanket embodied relatively low-temperature fibers which melted in a short time at high temperatures.

An object of the present invention is the production of glass fibers utilizing iron oxide as a fluidizer. Through the use of iron oxide, the viscosity and refining time is reduced, thus requiring less time to provide freedom from impurities and/or entrapped gases. This enables continuous or discontinuous fibers to be manufactured with relative ease. Iron oxide with other high temperature melting oxides are used to produce high temperature resistance properties, good thermal insulation and acoustical properties, high strength, and high modulus of elasticity. The glass compositions containing iron oxide according to the invention can be formed into long and/or short stable glass fibers.

An object of the invention is the provision of a glass composition having high strength and being adapted to be drawn into long, strong glass fibers.

Substantial cost reductions are provided by the present invention because of the utilization of relatively inexpensive raw materials, low energy use, high temperature resistance, good insulation, good acoustical properties, and high strength.

BRIEF DESCRIPTION OF THE SEVERAL VIEWS OF THE DRAWINGS

Not applicable.

DETAILED DESCRIPTION OF THE INVENTION

The present invention relates to my U.S. Pat. No. 6,998,361 and relates to glass compositions and particularly to bio-soluble glass compositions having good fiberizing characteristics, high strength, durability, and having high modulus of elasticity, very good thermal insulation and acoustical properties, and high temperatures resistance.

To achieve the very good thermal and acoustical properties that meet aerospace requirements requires that the fibers have a diameter of 0.5 to 2.0 microns.

During the current and previous research efforts it was found that to develop a direct replacement of insulation material for aircraft to meet the required burn-through, acoustical, thermal and other properties required that the fibers be within the 0.5 to 2.0 micron range.

In the course of research and development work relative to the present invention, a wide range of fiber diameters were investigated, such range being from 0.5 to 5.0 microns. High temperature values were obtained throughout such range which satisfies the FAA burn-through requirement under Regulation FAR 25.856(b). High temperature insulation values were obtained throughout the range, independent of fiber diameters. However, these fiber materials would only be useful as acceptable replacement products if the thermal and acoustical properties could be satisfied. This required the fiber diameter be reduced to a range of 0.5 to 2.0 microns.

The glass fibers were prepared utilizing a specific raw materials which included silica, iron oxide, alkali metal oxides, and alkaline earth metal oxides.

Glasses of the present invention were prepared by melting raw glass-making material in the following range of temperatures: between about 2,600° F. to about 2,950° F., utilizing conventional refractory containers.

Glass compositions according to the invention have a liquidus temperature of approximately 2,400° F., which is suitable for glass forming.

The glass can be formed into fibers for insulation and acoustical components using the centrifugal rotary process (vertical and horizontal), or blowing and flame processes. The glass can also be drawn into continuous and stable fibers.

The material of the invention differs from other high-temperature glass in that the fibers of the invention differ from prior art in that the material of the invention has good resistance to devitrification at the forming temperature, and requires lower processing energy than other high temperature fibers at a Log 3 viscosity.

The molten glass may also be formed into continuous fibers on a conventional drawing wheel at speeds of 4,000 to 12,000 feet per minute at temperatures between 2,400° F. to about 2,600° F. Speeds between about 3,000 to about 4,000 feet per minute are preferable in order to provide optimum filament properties. Continuous fibers may be drawn from about 9 microns to about 14 microns in diameter. Diameters of about 9 microns are preferred. Non-continuous fibers were produced using the centrifugal, blowing and flame processes having fiber diameters ranging from 0.5 to 5.0 microns.

In the course of the research work, it was determined that the long term results obtained are provided by amorphous glass fibers being converted during long term burn-through tests into a ceram glass which forms a fiber mat wherein the fiber integrity is maintained, thus preventing high temperatures from penetrating the insulation blanket containing the fibers according to the invention.

Temperatures as high as 2,450° F. for several hours failed to burn-through the aircraft insulation blankets.

The initial work conducted under this effort followed the work described in my U.S. Pat. No. 6,998,361. The objective is to improve the desired properties while reducing the complexity of the process, by the selection and use of different and fewer oxides.

The glass composition was mixed using conventional glass-making materials and was melted in a refractory furnace. The resultant glasses were successfully fiberized into continuous and non-continuous glass fibers.

Set forth below are illustrative examples of exemplary embodiments of the present invention:

| Oxides | Example 1 wt % | Example 2 wt % | Example 3 wt % | Example 4 wt % |
|---|---|---|---|---|
| $SiO_2$ | 81.00 | 74.80 | 76.78 | 73.53 |
| $Na_2O$ | 2.40 | 1.90 | 0 | 4.97 |
| CaO | 8.30 | 9.70 | 4.89 | 6.77 |
| MgO | 6.10 | 4.10 | 2.83 | 3.31 |
| $Fe_2O_3$ + FeO | 2.60 | 8.30 | 5.00 | 10.00 |
| $TiO_2$ | 0 | 1.20 | 0 | 1.40 |
| $K_2O$ | 0 | 0 | 6.00 | 0 |

In this research work, resultant fibers were collected an a metal conveyor, and maintained thereon during the rest of the manufacture process. Typical raw materials used were: silica sand, iron oxide, soda ash, pot ash, lithium carbonate, boric acid, borax, dolomite limestone, dolime, and titania dioxide. Compositions according to the present invention provided a reduction in cost when compared to other high temperature insulation materials being tested as a replacement for fiber blankets currently being used in aircraft.

Fibers according to the present invention, for insulation blankets for aircraft, may have the following components in the following specified ranges of percentages:

| COMPOSITIONAL RANGE | |
|---|---|
| Oxide | Oxide Weight % |
| $SiO_2$ | 46.47 to 81.57 |
| $B_2O_3$ | 0 to 9.00 |
| $Na_2O$ | 0 to 9.80 |
| $Li_2O$ | 0 to 10.00 |
| $K_2O$ | 0 to 5.70 |
| CaO | 0 to 18.00 |
| MgO | 0 to 10.00 |
| $Fe_2O_3$ + FeO | 0 to 11.95 |

High temperature fibers are less expensive because of the use of low cost raw materials, lower energy and higher productivity in processing them into glass fibers. In addition, it has been determined that less binder is required than in commercially available insulation fibers due to the improved surface condition and high strength of the fibers.

Insulation fiber diameters may range from about 0.5 to 5.0 microns. All of the above-outlined processes may be utilized to manufacture glass fibers in the above noted diameter range.

The preferred fiber diameter range for aircraft fibrous blankets is 0.5 to 2.0 microns. The chemical components of the glass compositions described herein provide a tightly bonded surface that results in a very high strength and high chemical resistance which are characteristics required in aircraft.

Another advantage of fiber blankets made of the above noted compositions is their ability to repel liquids when treated properly.

It will be understood that various changes and modifications may be made from the preferred embodiments discussed above without departing from the scope of the present invention, which is established by the following claims and equivalents thereof.

The inventor claims:

1. A bio-soluble glass composition with a liquidus temperature of approximately 2400 degrees F. for producing high temperature glass fibers capable of being formed into an insulation blanket having burn through properties compliant with FAA Regulation FAR 25.856(b), said glass composition consisting of:
   about 74 to 80 wt % $SiO_2$;
   at least 2.6 wt % $Fe_2O_3$+FeO;
   at least about 8% wt % CaO+MgO+$TiO_2$; and
   up to about 6 wt % $Na_2O$+$Li_2O$+$K_2O$+$B_2O_3$.

2. The glass composition of claim 1, wherein the $Fe_2O_3$+FeO have a combined wt % of not more than about 10.

3. The glass composition of claim 2, wherein the $Fe_2O_3$+FeO have a combined wt % of about 3.

4. The glass composition of claim 2, wherein the $Fe_2O_3$+FeO have a combined wt % of about 8.

5. The glass composition of claim 2, wherein the i $Fe_2O_3$+FeO have a combined wt % of about 5.

6. The glass composition of claim 2, wherein the $Fe_2O_3$+FeO have a combined wt % of about 10.

7. The glass composition of claim 3, wherein the $SiO_2$ has a wt % of not less than about 75.

8. The glass composition of claim 4, wherein the $SiO_2$ has a wt % of not less than about 77.

9. The glass composition of claim 1, wherein the combined wt % of CaO and MgO is at least 10.

10. The glass composition of claim 1, wherein the wt % of CaO is at least about 5 and of MgO is at least about 3.

11. A glass fiber made from the glass composition of claim 1, wherein the wt % of $Fe_2O_3$+FeO is less than 11.95%.

12. A glass fiber made from glass composition of claim 1, wherein the wt % of CaO+MgO+$TiO_2$ is less than about 15%.

13. A glass fiber made from glass composition of claim 1, wherein the wt % of $Fe_2O_3$+FeO is less than about 11.95% and the wt % of CaO+MgO+$TiO_2$ is less than about 15%.

* * * * *